United States Patent [19]

Garrigue et al.

[11] Patent Number: 4,977,238

[45] Date of Patent: Dec. 11, 1990

[54] ADDITIVES SUITABLE FOR USE IN AMINOPLASTIC RESINS

[75] Inventors: Roger Garrigue; Jack Lalo, both of Toulouse, France

[73] Assignee: Norsolor S. A., Paris La Defense, France

[21] Appl. No.: 443,851

[22] Filed: Nov. 29, 1989

Related U.S. Application Data

[63] Continuation-in-part of Ser. No. 345,267, May 1, 1989, abandoned.

[30] Foreign Application Priority Data

Apr. 29, 1988 [FR] France .................................. 88 05744

[51] Int. Cl.$^5$ ........................ C08G 12/12; C08G 14/08
[52] U.S. Cl. .................................... 528/230; 528/246; 528/249; 528/256; 525/154; 525/158
[58] Field of Search ............... 528/230, 246, 249, 256; 525/154, 158

[56] References Cited

U.S. PATENT DOCUMENTS

| | | | |
|---|---|---|---|
| 4,395,306 | 7/1983 | Killat | 162/156 |
| 4,473,678 | 9/1984 | Fink et al. | 524/211 |

FOREIGN PATENT DOCUMENTS

| | | |
|---|---|---|
| 201386 | 11/1986 | European Pat. Off. . |
| 202976 | 11/1986 | European Pat. Off. . |
| 827059 | 4/1938 | France . |
| 482897 | 9/1937 | United Kingdom . |

OTHER PUBLICATIONS

Chemical Abstracts, vol. 85, No. 26, Dec. 26, 1976, p. 32, Abstract No. 193563x.
Chemical Abstracts, vol. 76, No. 8, Feb. 21, 1972, p. 23, Abstract No. 34886c.
CA110(22):193815R "Addition of a Double Bond to Urea-Formaldehyde Polycondensates".
CA107(2): 7786x "Preparation of Acrylic Derivatives of Urea".
CA94(14):104598h "Glass Fiber Mat with Improved Binder".
CA97(2):8074a "Aminoplast Solutions".

Primary Examiner—John Kight, III
Assistant Examiner—Sam A. Acquah
Attorney, Agent, or Firm—Millen, White & Zelano

[57] ABSTRACT

Precondensates of urea and formaldehyde containing monomethylolacrylamidomethyleneurea are produced from pure acrylamidomethyleneurea and urea/formaldehyde precondensate or from the starting substances used for the manufacture of acrylamidomethyleneurea with formaldehyde. They are useful additives for aminoplastic resins, which in turn may be used as glue in the manufacture of chipboard sheets.

10 Claims, No Drawings

ADDITIVES SUITABLE FOR USE IN AMINOPLASTIC RESINS

This application is a continuation-in-part of application Ser. No. 07/345,267 filed May 1, 1989 now abandoned.

CROSS REFERENCE TO RELATED APPLICATION

This application is related to applicants' concurrently filed United States applications entitled: New Acrylic Derivative of Urea, Attorneys' Docket NORSO 8, priority based on French application No. 88 05745 filed Apr. 29, 1988, and New Process for Manufacturing Urea/Formaldehyde Resin, Attorneys' Docket NORSO 9, priority based on French application No. 88 05764 filed Apr. 29, 1988.

BACKGROUND OF THE INVENTION

The present invention relates to new additives suitable for use in aminoplastic resins; it relates especially to new acrylic additives derived from urea.

Acrylic derivatives of urea are already known. The acrylic compounds used as starting substances are most often acrylamide and acrylonitrile. Thus, the polycondensation of urea, formaldehyde and acrylamide in a weakly alkaline medium with a view to preparing methylolated products, followed by the addition of styrene or methyl acrylate, has been proposed (in particular, Kostyukov et al. - USSR No. 277,550, 3rd June 1970). The preparation of acrylic derivatives of urea from methacrylamide, formaldehyde and urea has also been proposed (French Application No. 85/06,106). A new process for manufacturing acrylamidomethyleneurea has also been described (French Application No. 85/06,103), which process consists in reacting, in a first stage, acrylamide with formaldehyde in a basic medium with a view to obtaining monomethylolacrylamide, and then, in a second stage, in reacting the latter compound with urea in an acid medium.

In the above cross-referenced application, New Acrylic Derivative of Urea, a new product of formula:

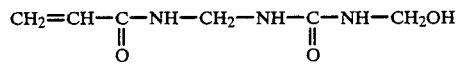

which is monomethylolacrylamidomethyleneurea, is described. It has now been found that new products based on monomethylolacrylamidomethyleneurea enable this acrylic derivative to be used in a form such that its separation from the reaction medium is not required.

SUMMARY OF THE INVENTION

The present invention relates to new acrylic additives derived from urea, characterized in that they consist of precondensates of urea and formaldehyde containing monomethylolacrylamidomethyleneurea.

The new additives which are the subjects of the invention are especially suitable as additives in aminoplastic resins, in particular in urea/formaldehyde resins used as wood glues.

The new additives of the invention are prepared according to two procedures. According to a first procedure, a device consisting of two reactors arranged one above the other is used. In the upper reactor, acrylamidomethyleneurea is prepared in an aqueous phase according to the procedure described in French Application No. 85/06,103 filed by the Applicant, which consists in reacting acrylamide, urea and formaldehyde. In the lower reactor, a solution of formaldehyde with an inhibitor such as hydroquinone methyl ether is added, and the contents of the upper reactor consisting of the acrylamidomethyleneurea suspension are then added thereto. This addition is carried out portionwise at a temperature of 90° C. According to a second procedure for the process which is the subject of the invention, pure acrylamidomethyleneurea, prepared, for example, according to French Application No. 85/06,103, is employed, and this is added to a urea/formaldehyde precondensate in the presence of an inhibitor at a pH in the region of 7.5 and at a temperature of approximately 70° C.: the reaction is continued until a dissolution of the acrylamidomethyleneurea is complete.

According to the invention, the preparation of the precondensates of urea and formaldehyde containing monomethylolacrylamidomethyleneurea is carried out employing quantities of reactants such that there are from 0.1 to 4 moles of acrylamidomethyleneurea for 4 moles of urea and between 16 and 24 moles of formaldehyde in the reaction medium. The precondensates of urea and formaldehyde employed are known products: they contain urea and formaldehyde in F/U mole ratios of between 4 and 6.

The new additives which are the subject of the invention are used in aminoplastic resins. Their use resulting in resins which are especially suitable for the manufacture of wood-based sheets. They are used as they are after their preparation, without it being necessary to separate and purify the monomethylolacrylamidomethyleneurea from the reaction mixture.

The examples which follow illustrate the present invention.

EXAMPLE 1

Two reactors are arranged one above the other; the upper reactor is jacketed. The reactors are equipped with a stirring and heating device.

In the upper reactor, the synthesis of acrylamidomethyleneurea is carried out. 90.8 g of 37% strength formaldehyde, 80 g of water, 200 mg of hydroquinone methyl ether and 79.4 g of acrylamide are introduced into this reactor.

The reaction medium is heated for 30 minutes to 50° C., the pH being maintained at 8.5 by adding sodium hydroxide.

After the mixture is cooled to 15° C., 212.8 g of urea are added, followed by 44 cm³ of concentrated hydrochloric acid solution. The reaction medium is heated for 2 hours to 40° C. After being cooled to 20° C., the reaction medium is neutralized by adding 8 cm³ of sodium hydroxide solution at 50° C. 1.5 cm³ of 10% strength sodium hydroxide solution are added (pH=8.06). In the bottom reactor, 200 mg of hydroquinone methyl ether are added to 522 g of 70% strength aqueous formaldehyde solution. The contents of the upper reactor are poured into the bottom reactor portionwise at a temperature of 90° C.: the operation is carried out in the course of 30 minutes. The solution obtained is cooled slowly; it is clear.

EXAMPLE 2

60 g of pure acrylamidomethyleneurea, 120 mg of hydroquinone methyl ether and 350 g of a urea/formaldehyde precondensate, prepared from a 49% strength solution of formaldehyde and a 20% strength solution of urea, are introduced into a reactor. The pH of the reaction medium is maintained at 7.5, and the reaction is carried out at 70° C. until the acrylamidomethyleneurea is solubilized.

EXAMPLE 3

20% by weight of urea/formaldehyde precondensate containing monomethylolacrylamidomethyleneurea is added to a urea/formaldehyde resin.

The table which follows shows the characteristics of the resin, as well as the properties of the chipboard sheets manufactured with this resin. The sheets were produced under the following conditions:

| Gluing | 7% dry resin/dry shavings | |
|---|---|---|
| Sheet thickness | 16 mm | |
| Pressing | Pressure | 30 daN/cm$^3$ |
| | Temperature | 180° C. |
| | Constant pressure time | 4 minutes |

The characteristics of the sheets were obtained according to the following standards:

| Formaldehyde content (perforator) | Standard EN 120 |
|---|---|
| Thickness, density | Standard NFB 51 222 |
| Traction V 20 | Standard NFB 51 250 |
| Swelling % | Standard NFB 51 252 |

TABLE

| Resin | |
|---|---|
| Viscosity mPa.s | 280 |
| Dry extract (%) | 65.7 |
| Gelling time at 80° C. (seconds) | 145 |
| Water tolerance (20° C.) | 5/1 |
| Sheets | |
| Swelling 24 hours, cold water (%) | 13.6 |
| Absorption % (for density 600 kg/m$^3$) | 65.6 |
| Traction N/mm$^2$ | 0.57 |
| Formaldehyde (perforator), iodine mg/100 g of dry shavings | 8.3 |
| Moisture % | 6.5 |

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

In the foregoing, all temperatures are set forth uncorrected in degrees Celsius and unless otherwise indicated, all parts and percentages are by weight.

The entire texts of all applications, patents and publications, cited above, and of corresponding French application No. 88 05744, are hereby incorporated by reference.

What is claimed is:

1. An acrylic additive derived from urea, comprising precondensate of urea and formaldehyde containing monomethylolacrylamidomethyleneurea.

2. A process for manufacturing the additive according to claim 1, characterized in that acrylamidomethyleneurea is prepared from acrylamide, urea and formaldehyde and the acrylamidomethyleneurea obtained is reacted with formaldehyde.

3. A process for manufacturing the additive according to claim 1, characterized in that acrylamidomethyleneurea is reacted with a urea/formaldehyde precondensate at a pH in the region of 7.5.

4. A process according to claim 2, characterized in that the quantity of reactants employed is such that there are from 0.1 to 4 moles of acrylamidomethyleneurea for 4 moles of urea and between 16 and 24 moles of formaldehyde in the reaction medium.

5. A process according to claim 3, characterized in that the quantity of reactants employed is such that there are from 0.1 to 4 moles of acrylamidomethyleneurea for 4 moles of urea and between 16 and 24 moles of formaldehyde in the reaction medium.

6. An aminoplast resin containing an acrylic additive according to claim 1.

7. A chipboard sheet comprising wood chips and glue, wherein the glue comprises an aminoplast resin according to claim 6.

8. A product as produced by the process of claim 5.

9. An aminoplast resin containing the product of claim 8.

10. A chipboard sheet comprising wood chips and glue, wherein the glue comprises an aminoplast resin according to claim 9.

* * * * *